United States Patent
Mutsuga et al.

(10) Patent No.: US 10,175,056 B2
(45) Date of Patent: *Jan. 8, 2019

(54) ROUTE SEARCH SYSTEM, METHOD, AND PROGRAM

(71) Applicant: AISIN AW CO., LTD., Anjo-shi, Aichi-ken (JP)

(72) Inventors: Katsuhiko Mutsuga, Anjo (JP); Atsushi Mochizuki, Okazaki (JP)

(73) Assignee: AISIN AW CO., LTD., Anjo (JP)

(*) Notice: Subject to any disclaimer, the term of this patent is extended or adjusted under 35 U.S.C. 154(b) by 84 days.

This patent is subject to a terminal disclaimer.

(21) Appl. No.: 15/527,640

(22) PCT Filed: Nov. 19, 2015

(86) PCT No.: PCT/JP2015/082519
§ 371 (c)(1),
(2) Date: May 17, 2017

(87) PCT Pub. No.: WO2016/104002
PCT Pub. Date: Jun. 30, 2016

(65) Prior Publication Data
US 2017/0343364 A1    Nov. 30, 2017

(30) Foreign Application Priority Data
Dec. 24, 2014    (JP) .................. 2014-259910

(51) Int. Cl.
*G01C 21/34*    (2006.01)
*G08G 1/00*    (2006.01)
(Continued)

(52) U.S. Cl.
CPC ......... *G01C 21/34* (2013.01); *G01C 21/3484* (2013.01); *G08G 1/00* (2013.01);
(Continued)

(58) Field of Classification Search
CPC .... G01C 21/34; G01C 21/3484; G09B 29/10; G09B 29/00; G08G 1/137; G08G 1/00
See application file for complete search history.

(56) References Cited

U.S. PATENT DOCUMENTS 5,926,118 A    7/1999  Hayashida et al.
8,255,162 B2   8/2012  Okude et al.
(Continued)

FOREIGN PATENT DOCUMENTS

JP    H09-014984 A     1/1997
JP    2000-304563 A   11/2000
(Continued)

OTHER PUBLICATIONS

Nov. 10, 2017 Supplementary Search Report issued in European Application No. 15872571.3.
(Continued)

*Primary Examiner* — Yuen H Wong
(74) *Attorney, Agent, or Firm* — Oliff PLC

(57) ABSTRACT

Route search systems, methods, and programs acquire movement paths of a plurality of users, and classify, on the basis of a plurality of characteristics of the movement paths of the plurality of users, the movement paths of each of the users into a plurality of types such that movement paths with a plurality of similar characteristics belong to a same type. The systems, methods, and programs set a cost for each of the types and each attribute of a road on the basis of the plurality of movement paths of each of the types, classify, on the basis of a plurality of characteristics of a movement path of a route searcher, the route searcher into one of the types, and search for a route on the basis of the cost which is set for the type of the route searcher.

11 Claims, 4 Drawing Sheets

(51) Int. Cl.
*G08G 1/137* (2006.01)
*G09B 29/00* (2006.01)
*G09B 29/10* (2006.01)

(52) U.S. Cl.
CPC ............. *G08G 1/137* (2013.01); *G09B 29/00* (2013.01); *G09B 29/10* (2013.01)

(56) References Cited

U.S. PATENT DOCUMENTS

| | | |
|---|---|---|
| 8,583,661 B2 | 11/2013 | Fujii et al. |
| 2009/0048775 A1 | 2/2009 | Okude et al. |
| 2013/0191314 A1* | 7/2013 | Li .............................. G06N 5/04 706/46 |
| 2015/0177014 A1 | 6/2015 | Hosoi |

FOREIGN PATENT DOCUMENTS

| | | |
|---|---|---|
| JP | 2006-177804 A | 7/2006 |
| JP | 2009-042051 A | 2/2009 |
| JP | 2010-008284 A | 1/2010 |
| JP | 2014-044182 A | 3/2014 |

OTHER PUBLICATIONS

Feb. 16, 2016 International Search report issued in Patent Application No. PCT/Jp2015/082519.

* cited by examiner

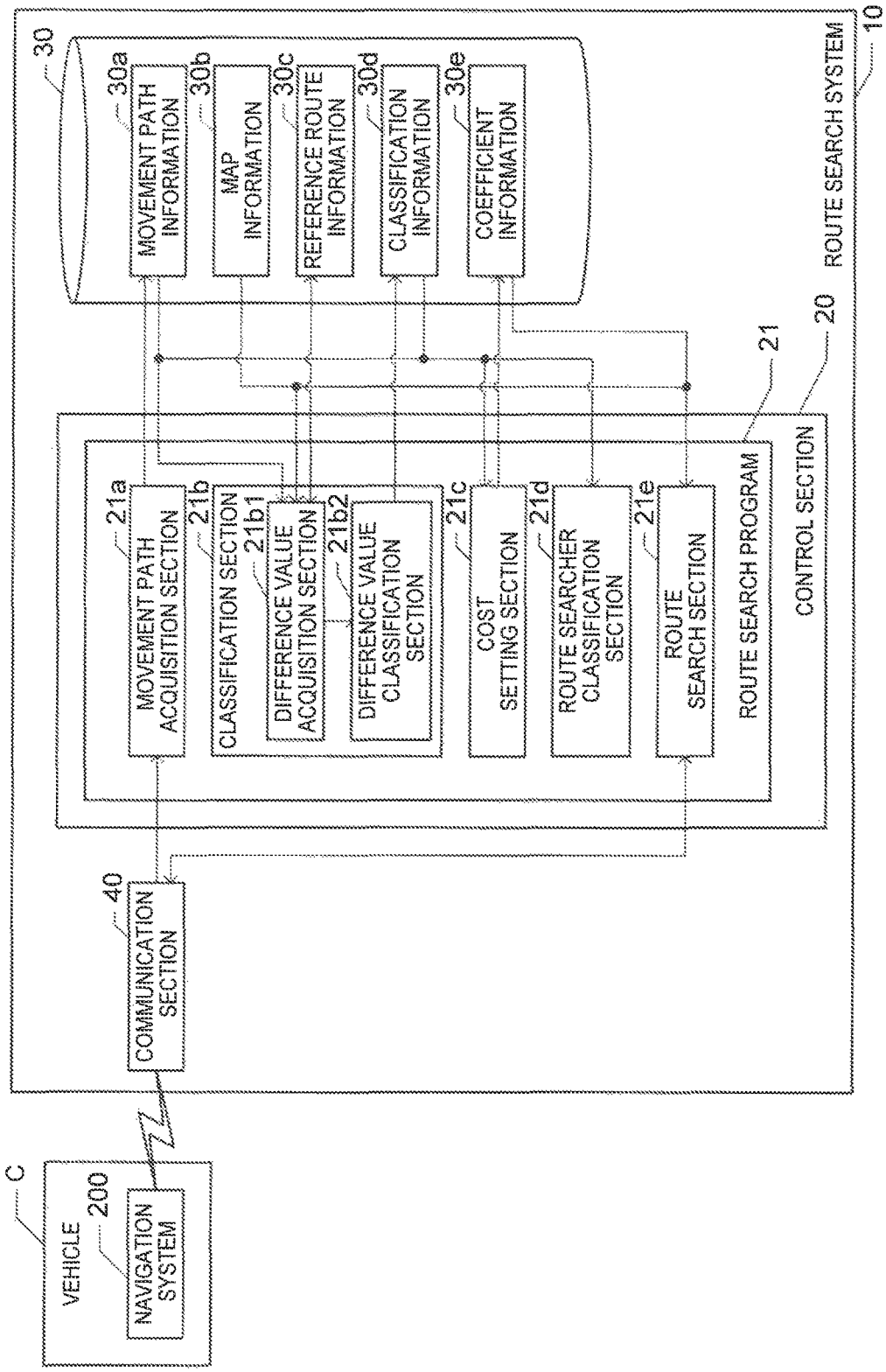

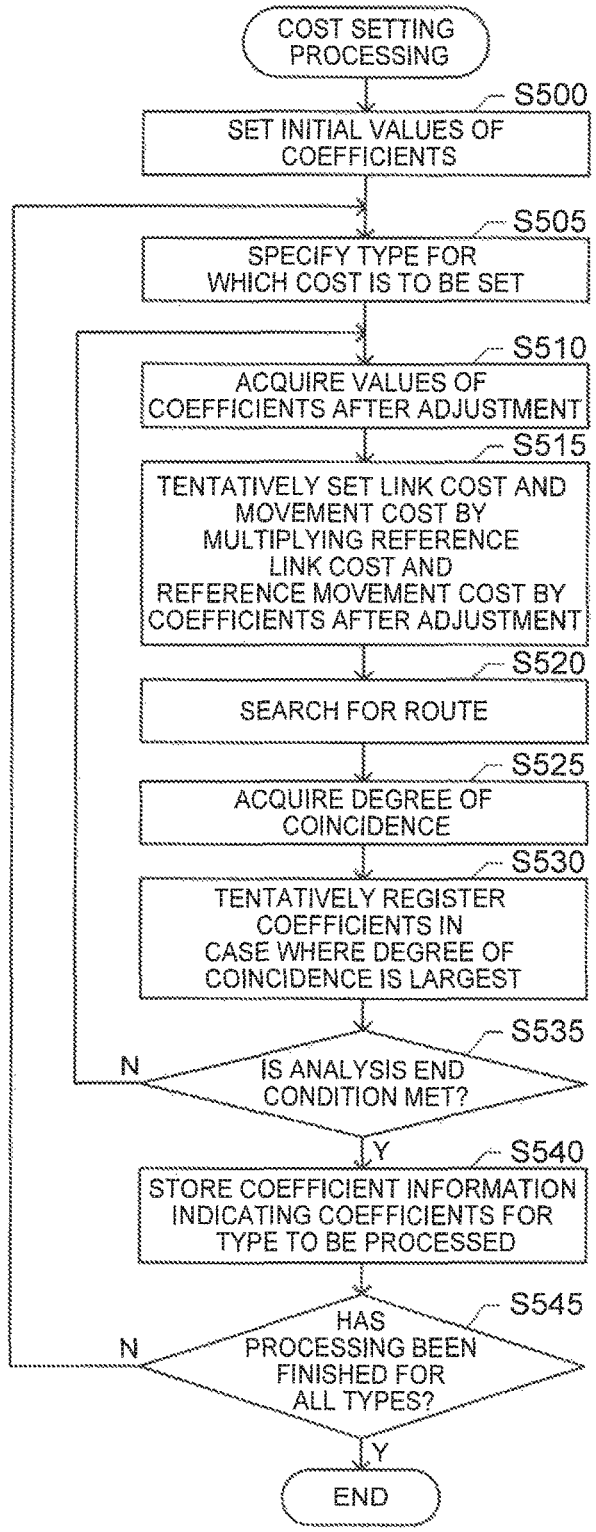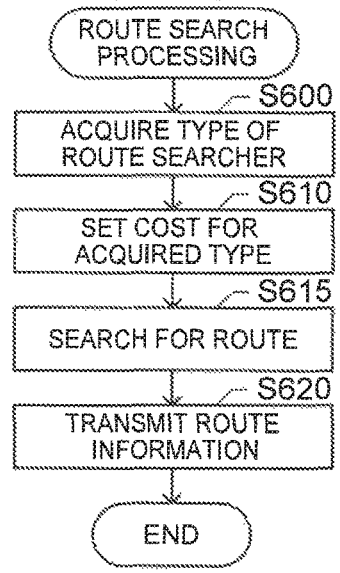

ROUTE SEARCH SYSTEM, METHOD, AND PROGRAM

TECHNICAL FIELD

Related technical fields include route search systems, methods, and programs.

BACKGROUND

There has hitherto been developed a technique that enables execution of a route search according to the taste of a user in route selection. For example, Japanese Patent Application Publication No. 2009-42051 (JP 2009-42051 A) discloses a configuration in which the frequency of use of links is calculated as the degree of preference for each taste item, such as vehicle type, age, and sex, that may be a factor for route selection, and stored as a taste parameter, and a cost is adjusted on the basis of taste parameters that are similar to attribute data on the user to search for a route (JP 2009-42051 A, claim 1, FIG. 4, and so forth).

SUMMARY

In the related art discussed above, the frequency of use of the links is analyzed separately for each taste item decided in advance. In the related art, such taste items are items decided artificially in advance as items that may be factors for route selection. However, the taste of the user does not always appear in each item decided artificially. For example, even if the frequency of use of the links is analyzed separately for each age, the frequency of use of the links cannot be analyzed appropriately if the taste of link selection does not depend on the age. Even if a correction is made by referencing the frequency of use for different ages or the like in order to take users that are younger than their actual age into consideration (JP 2009-42051 A, 0051), the frequency of use for the different ages discussed above may be inappropriate if the taste of link selection does not depend on the age, and therefore there is no point in making a correction. In the related art, in this way, the analysis of the frequency of use, on which cost computation is based, may be inappropriate.

Exemplary embodiments of the broad inventive principles described herein address the foregoing issue, and provide a technology that enables definition of a plurality of types that adequately reflect the tastes of users.

Exemplary embodiments provide systems, methods, and programs that acquire movement paths of a plurality of users, and classify, on the basis of a plurality of characteristics of the movement paths of the plurality of users, the movement paths of each of the users into a plurality of types such that movement paths with a plurality of similar characteristics belong to a same type. The systems, methods, and programs set a cost for each of the types and each attribute of a road on the basis of the plurality of movement paths of each of the types, classify, on the basis of a plurality of characteristics of a movement path of a route searcher, the route searcher into one of the types, and search for a route on the basis of the cost which is set for the type of the route searcher.

That is, in the route search system, method, and program, movement paths of each of a plurality of users are classified into types on the basis of a plurality of characteristics of the movement paths of the users. Here, the characteristics of the movement paths can be considered to reflect the tastes of the users. Therefore, if the movement paths are classified into a plurality of types on the basis of a plurality of characteristics of the movement paths, the types can be considered to correspond to the tastes of the users, which makes it possible to classify the tastes of the users into a plurality of types. In such classification, the characteristics are not classified into elements determined in advance, but movement paths of a plurality of users are collected and a plurality of characteristics of the movement paths are set so as to be similar to each other. Thus, when an analysis is started, the classification result does not allow arbitrariness, but objective classification can be obtained from the characteristics of movement paths of a plurality of users. Therefore, it is possible to define a plurality of types that adequately reflect the tastes of users.

Furthermore, such classification of types is defined on the basis of movement paths of a plurality of users and the difference between routes for a plurality of characteristics. Therefore, the types as the tastes not only reflect the taste of a particular user, but also reflect the tastes of a plurality of users. Thus, it is possible to objectively define the tastes. Therefore, by searching for a route on the basis of the cost which is set for each of the types, it is possible to execute a route search that reflects the tastes of a plurality of users through simple processing.

Furthermore, the cost setting means sets a cost for each of the types and each attribute of the road on the basis of the plurality of movement paths of each of the types. Therefore, it is possible to set a cost so as to select an attribute of the road corresponding to the taste for each type. In this configuration, further, the cost is set for each type and each attribute of the road. Therefore, assuming a certain type, the costs of a plurality of roads of the same attribute can be defined by setting the costs of the roads of such an attribute collectively to a common value or using a common technique. Thus, it is not necessary to individually set the cost for each road section, and the costs for roads included in a zone of a predetermined unit can be defined through significantly simple processing.

BRIEF DESCRIPTION OF THE DRAWINGS

FIG. 1 is a block diagram illustrating a route search system.

FIG. 3A is a flowchart of cost setting processing, and FIG. 3B is a flowchart of route search processing.

DETAILED DESCRIPTION OF EXEMPLARY EMBODIMENTS

Figure 2A:
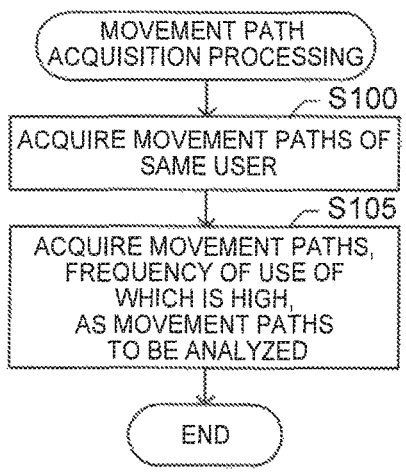
FIG. 2A is a flowchart of movement path acquisition processing.

Hereinafter, embodiments will be described in the following order:
(1) Configuration of Route Search System
(2) Movement Path Acquisition Processing
(3) Reference Route Acquisition Processing
(4) Classification Processing
(5) Cost Setting Processing
(6) Route Searcher Classification Processing
(7) Route Search Processing
(8) Other Embodiments

(1) Configuration of Route Search System

FIG. 1 is a block diagram illustrating the configuration of a route search system 10 according to an embodiment. The route search system 10 according to the embodiment includes a control section 20 that includes a CPU, a RAM, a ROM, and so forth, a storage medium 30, and a communication section 40. The control section 20 can execute programs stored in the ROM and the storage medium 30. The communication section 40 is a device that performs wireless communication with a vehicle C. That is, the control section 20 controls the communication section 40 to communicate with the vehicle C at a desired timing to exchange desired information.

In the embodiment, there are a plurality of vehicles C capable of communication with the route search system 10. In addition, the vehicles C each include a navigation system 200. The navigation system 200 can execute route guide processing. That is, the navigation system 200 acquires a route from a departure location to a destination location indicated by a user, and provides guidance in order to guide the vehicle C along the route. In the embodiment, the route search system 10 is configured to search for a route in accordance with a request from the user of the navigation system 200.

That is, when the user of the navigation system 200 indicates a departure location and a destination location, the navigation system 200 transmits a request for a route search to the route search system 10 together with information that indicates the departure location and the destination location. In the route search system 10, when the control section 20 receives the request for a route search via the communication section 40, the control section 20 searches for a route from the departure location to the destination location, and transmits information that indicates a route to the vehicle C. In the vehicle C, when the navigation system 200 acquires the information which indicates the route, the navigation system 200 provides route guidance on the basis of the information. The user performs a route search is called a "route searcher".

Furthermore, the navigation system 200 has a function of communicating with the route search system 10 at a prescribed timing and transmitting movement path information (probe information) that indicates a path along which the vehicle C has moved to the route search system 10. That is, the navigation system 200 acquires and holds information that indicates road sections through which the vehicle has passed, and transmits the information to the route search system 10 at a predetermined transmission timing. In the embodiment, the movement path information which is transmitted from the navigation system 200 is information that indicates the user (such as an ID for each navigation system or an ID for each user), the departure location, the destination location, and the road sections which constitute the movement path.

As described above, the route search system 10 which is capable of communication with the vehicle C is configured to search for a route that matches the taste of the route searcher. In the embodiment, a route search program 21 is stored in the ROM or the storage medium 30, and the control section 20 can search for a route that matches a taste by executing the route search program 21.

In order for reference in a route search or the like, the storage medium 30 stores map information 30b in advance. The map information 30b includes node data that indicate the position of nodes corresponding to end points of road sections, shape interpolation point data that indicate the position etc. of shape interpolation points for specifying the shape of the roads between the nodes, link data that indicate coupling between the nodes, facility data that indicate the position and the attribute of facilities, and so forth. Furthermore, the link data include information that indicates a reference link cost which is the cost of each road section, and information that indicates a reference movement cost which is the cost of movement from a certain road section to another road section. In the embodiment, a search is performed for a route with a small total sum of reference link costs and reference movement costs. In the embodiment, the reference link cost is a value decided in accordance with the distance (or travel time) of the road section, and is set to a larger value as the distance of the road section is longer (or the travel time of the road section is longer). In the embodiment, further, a route search is performed on the basis of a link cost and a movement cost calculated by multiplying the reference link cost and the reference movement cost by a predetermined coefficient. By default, a route search is performed on the basis of a cost set by multiplying a reference cost by a reference coefficient (a link cost obtained by multiplying the reference link cost by a reference coefficient for the link cost and a movement cost obtained by multiplying the reference movement cost by a reference coefficient for the movement cost). In the embodiment, further, a search can be performed under different conditions. In this case, a link cost and a movement cost are set by multiplying the reference link cost and the reference movement cost by a coefficient for each condition, and a search is performed on the basis of the set link cost and movement cost.

In the embodiment, further, the link data are correlated with information that indicates the attribute of the road in each road section. The information which indicates the attribute of the road is information related to the road type, lanes, the road width, and traffic signals. The information which indicates the road type is information that indicates the type of the road such as a national road, a general road, a narrow street, and a toll road. In the case where the road is a toll road, the information also includes information for calculating a toll. The information which indicates lanes is information that indicates the number of lanes, and information that indicates the number of lanes in each direction together with differentiation as to whether the road allows one-side traffic or two-side traffic.

The information which indicates the road width is information that enables a relative comparison among the widths of the roads. In the embodiment, the information indicates the width of roads in three stages (wide, narrow, and normal). The information related to traffic signals includes information that indicates the position of a traffic signal in the case where there is a traffic signal at an end point of or in the middle of a road section. The information also indicates the configuration of the traffic signal. Examples of the information which indicates the configuration of the traffic signal include information that indicates whether or not the traffic signal has a signal exclusively for a right or left turn.

In order to enable execution of a route search according to the taste of the route searcher with the map information 30b defined in this way, the route search program 21 includes a movement path acquisition section 21a, a classification section 21b, a cost setting section 21c, a route searcher classification section 21d, and a route search section 21e. The movement path acquisition section 21a is a program module that causes the control section 20 to implement a function of acquiring movement paths of a plurality of users. That is, the control section 20 acquires movement path information transmitted from the plurality of vehicles C via the communication section 40, and stores the movement path information in the storage medium 30 (movement path information 30*a*). Furthermore, the control section 20 is configured to perform an analysis on the basis of the movement path information 30*a* which is stored in the storage medium 30 at predetermined intervals. Through processing performed by the movement path acquisition section 21*a*, the control section 20 references the movement path information 30*a*, and acquires movement paths to be analyzed.

In the embodiment, one movement path to be analyzed is specified for one user. That is, the movement path information which is transmitted from the navigation system 200 includes information that indicates movement paths at different times and dates acquired by the user of the navigation system 200 by driving the vehicle C at the different times and dates. Thus, the control section 20 acquires a movement path indicated in the movement path information which is transmitted from the same user (same navigation system 200) and the frequency of use of which by the user is a predetermined criterion or more as the movement path to be analyzed. That is, there is a high possibility that a path, the frequency of use of which by the user is a predetermined criterion or more (a path, the frequency of use of which can be considered to be higher than the frequency of use of the other paths), has been selected by the user in accordance with his/her taste. Thus, it is possible to perform an analysis with high reliability by acquiring a path, the frequency of use of which by the user is a predetermined criterion or more, as the movement path of the user. In the case where there are a plurality of paths, the frequency of use of which by the user is a predetermined criterion or more, the control section 20 considers the path with the highest frequency as the movement path to be analyzed.

The classification section 21*b* is a program module that causes the control section 20 to implement a function of classifying the movement paths of the users into a plurality of types such that movement paths with a plurality of similar characteristics belong to the same type on the basis of a plurality of characteristics of the movement paths of the plurality of users. That is, when a movement path that has a plurality of characteristics is treated as one sample, a plurality of samples have been obtained which indirectly indicate the taste of the user using the plurality of characteristics. Thus, the control section 20 considers a movement path specified as the movement path to be analyzed as one sample, and considers that the resulting classifications reflect a taste by classifying samples such that samples with a plurality of similar characteristics belong to the same type.

The plurality of characteristics of a movement path may be characteristics that affect route selection. In the embodiment, in order to allow analysis of characteristics that distinguish the taste of the users, the control section 20 contrasts the characteristics of a reference route and the characteristics of a movement path with each other. Specifically, through processing performed by a difference value acquisition section 21*b*1, the control section 20 acquires a difference value between a plurality of characteristics that indicates the difference between the characteristics of the reference route and the characteristics of the movement path to be analyzed (movement path of each of the plurality of users).

Here, the reference route is a route to be found in the case where a route search is performed from a departure location to a destination location of a movement path on the basis of the link cost which is obtained by multiplying the reference link cost by the reference coefficient for the link cost and the movement cost which is obtained by multiplying the reference movement cost by the reference coefficient for the movement cost. Thus, the control section 20 executes, for each of the movement paths to be analyzed, processing of acquiring a reference route by referencing the movement path information 30*a*, acquiring a departure location and a destination location of the movement path to be analyzed, and performing route search processing on the basis of the link cost which is obtained by multiplying the reference link cost by the reference coefficient for the link cost and the movement cost which is obtained by multiplying the reference movement cost by the reference coefficient for the movement cost. By determining such a route as the reference route, it is possible to distinguish the characteristics of a route selected by a user with a taste that is different from those of many users. When a reference route is acquired for each of the movement paths to be analyzed, the control section 20 stores reference route information 30*c* that indicates the reference route for each of the movement paths to be analyzed in the storage medium 30.

Furthermore, the control section 20 acquires characteristic values for a plurality of characteristic items for each route. That is, the control section 20 references the map information 30*b*, determines the proportion of the toll road, the proportion of the general road, the average number of lanes, the number of traffic signals, the route length, the required time, and the toll for the route as characteristic items, and acquires the values (called "characteristic values") of the characteristic items for the movement path to be analyzed and the reference route. The processing of acquiring the characteristic values of the characteristic items will be discussed in detail later. As described above, when the characteristic values are acquired for a plurality of characteristic items for each route, the control section 20 executes, for each of the movement paths to be analyzed, processing of acquiring a difference value for each characteristic item by subtracting the characteristic value of the reference route from the characteristic value of the movement path for each characteristic item.

When the difference value is acquired, through processing performed by a difference value classification section 21*b*2, the control section 20 classifies the movement paths of the users into a plurality of types such that movement paths with a plurality of similar difference values belong to the same type. That is, the difference value for each movement path is constituted from difference values for the plurality of characteristic items. Therefore, the control section 20 classifies the movement paths into a plurality of types corresponding to a plurality of tastes of the users by performing a multivariate analysis using the difference values for the plurality of characteristic items as variables. A factor analysis, a cluster analysis, or the like can be adopted as an example of the multivariate analysis. Here, the factor analysis is taken as an example.

Figure 4:
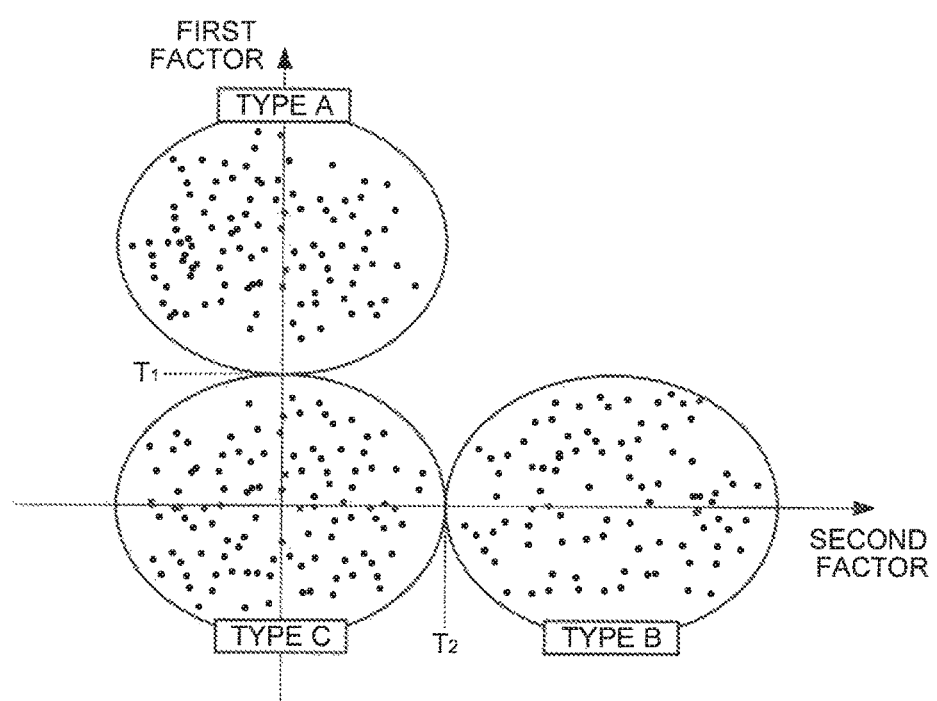
FIG. 4 illustrates an example of a multivariate analysis.

FIG. 4 schematically illustrates an overview of the factor analysis. The drawing illustrates an example in which two factors have been obtained through the factor analysis, and illustrates a graph in which movement paths of a plurality of users are plotted with the vertical axis representing a first factor and the horizontal axis representing a second factor. As illustrated in the drawing, when a factor analysis for movement paths in which a plurality of difference values are used as variables is completed, the movement paths as samples can be divided into a plurality of types using the resulting factors. That is, in the example illustrated in the drawing, when thresholds $T_1$ and $T_2$ are provided for the factors, the movement paths can be classified into types A, B, and C. When the factor analysis is performed as described above, the control section 20 stores information that indicates the types of the movement paths in the storage medium 30 as classification information 30*d*. When the classification information 30*d* is stored, the control section 20 can reference the classification information 30*d*, and specify which of the types a movement path belongs to on the basis of the plurality of characteristics of the movement path (the difference value for each characteristic item of the characteristics of the reference route and the movement path to be analyzed).

The cost setting section 21*c* is a program module that causes the control section 20 to implement a function of setting the link cost and the movement cost for each type on the basis of a plurality of movement paths of each type. That is, the link cost and the movement cost are indices to be referenced in route search. In the embodiment, a route with a small sum of the link cost and the movement cost is obtained as the search result. Thus, the control section 20 sets the link cost and the movement cost of the road for each of the types obtained through processing performed by the classification section 21*b* so that a road section that is highly likely to be selected by users that have a taste for each type tends to be obtained as the search result. In the embodiment, further, the link cost is set for each type, and set to each attribute of the road. That is, the control section 20 sets the link cost for each road type, each number of lanes, and each road width.

The link cost and the movement cost can be set in a variety of techniques. In the embodiment, the control section 20 sets the link cost and the movement cost such that a road section that is highly likely to be selected by users that have a taste for each type tends to be obtained as the search result. That is, the control section 20 calculates a coefficient for each attribute of the road such that a plurality of movement paths classified into the same type tend to be found through the search (as discussed in detail later). Information that indicates coefficients is stored in the storage medium 30 as coefficient information 30*e*.

With the coefficient information 30*e* defined in this way, the control section 20 can set the movement cost for each type by multiplying the reference link cost for each road section by the coefficient which is set for each type and each attribute of the road and multiplying the reference movement cost between the roads by the coefficient which is set for each type. With this configuration, it is possible to define the link cost for each type and each attribute of the road by only deciding the coefficient for each type and each attribute of the road, and to define the movement cost for each type by only deciding the coefficient for each type. Therefore, it is possible to save resources compared to individually holding information that indicates costs for all types. In addition, the cost can be changed easily even in the case where the cost is changed along with an increase in amount of accumulated information that indicates movement paths or the like.

The route searcher classification section 21*d* is a program module that causes the control section 20 to implement a function of classifying the route searcher into one of the types which are decided by the classification means on the basis of a plurality of characteristics of the movement path of the route searcher. That is, the control section 20 specifies a user that made a route search request on the basis of information included in the route search request, and considers the user as the route searcher. In addition, the control section 20 specifies movement paths to be analyzed on the basis of the movement path information 30*a*, and specifies a user that is the same as the route searcher from among users correlated with the movement paths to be analyzed. The control section 20 then considers the type of a movement path correlated with such a user as the type of the route searcher. As a result, the taste of the route searcher has been specified.

The route search section 21*e* is a program module that causes the control section 20 to implement a function of searching for a route on the basis of the cost which is set for the type of the route searcher. That is, the control section 20 delivers the type of the route searcher to the cost setting section 21*c*. Through processing performed by the cost setting section 21*c*, the control section 20 acquires a link cost and a movement cost that match the type of the route searcher by acquiring coefficients that match the type of the route searcher with reference to the coefficient information 30*e* and multiplying the reference link cost and the reference movement cost by the respective coefficients.

Through processing performed by the route search section 21*e*, the control section 20 searches for a route from the departure location to the destination location which are included in the route search request from the route searcher using a Dijkstra's algorithm or the like on the basis of the link cost and the movement cost which match the type of the route searcher. When a route is acquired, through processing performed by the route search section 21*e*, the control section 20 transmits information that indicates the route to the navigation system 200 via the communication section 40. As a result, in the navigation system 200 of the vehicle C, the user (route searcher) of the vehicle C is guided in accordance with the transmitted route.

In the configuration described above, the control section 20 sets the type corresponding to the taste of the user on the basis of a plurality of characteristics of movement paths of a plurality of users. In such classification of types, the characteristics are not classified into elements determined in advance, but movement paths of a plurality of users are collected and a plurality of characteristics of the movement paths are set so as to be similar to each other. Thus, when an analysis is started, the classification result does not allow arbitrariness, but objective classification can be obtained from the characteristics of movement paths of a plurality of users, which makes it possible to define a plurality of types that adequately reflect the tastes of the users.

Furthermore, such classification of types is defined on the basis of movement paths of a plurality of users and the difference between routes for a plurality of characteristics. Therefore, the types as the tastes not only reflect the taste of a particular user, but also reflect the tastes of a plurality of users. Thus, it is possible to objectively define the tastes. Therefore, by the control section 20 searching for a route on the basis of the cost which is set for each of the types, it is possible to execute a route search that reflects the tastes of a plurality of users through simple processing.

Furthermore, the control section 20 sets a link cost for each type and each attribute of the road on the basis of a plurality of movement paths for each type. Therefore, it is possible to set a link cost so as to select an attribute of the road corresponding to the taste for each type. In this configuration, further, the link cost is set for each type and each attribute of the road. Therefore, assuming a certain type, the link cost of a plurality of roads of the same attribute can be defined by setting the link costs of the roads of such an attribute collectively to a common value. Thus, it is not necessary to individually set the link cost for each road section, and the link costs for roads included in a zone of a predetermined unit can be defined through significantly simple processing.

(2) Movement Path Acquisition Processing

Next, movement path acquisition processing performed in the configuration discussed above will be described in detail. FIG. 2A is a flowchart illustrating the movement path acquisition processing. In the embodiment, this processing is performed at intervals determined in advance. In this processing, through processing performed by the movement path acquisition section 21a, the control section 20 references the movement path information 30a which is stored in the storage medium 30, and acquires movement paths of the same user (step S100). That is, the control section 20 references information that indicates a user correlated with the movement path information 30a, and executes, for each user, processing of acquiring the movement path information 30a with information that indicates the same user. As a result, the movement path information 30a has been acquired for each user.

Next, through processing performed by the movement path acquisition section 21a, the control section 20 acquires movement paths, the frequency of use of which is high, as the movement paths to be analyzed (step S105). That is, the control section 20 acquires routes that have a common departure location and a common destination location and that coincide with each other in a section of a predetermined ratio or more from among the movement paths of the same user. That is, the control section 20 considers routes that have a common departure location and a common destination location and that coincide with each other in a section of a predetermined ratio or more as one movement path. In the case where a plurality of routes (a plurality of routes with different departure locations or destination locations) are acquired as a result, the control section 20 acquires, from among the routes, routes that have been used a predetermined number of times or more within a predetermined period as the movement paths to be analyzed.

In the case where there are a plurality of routes that have been used the predetermined number of times or more within the predetermined period, the control section 20 acquires the movement path with the highest frequency of use as the movement path to be analyzed. Here, as a matter of course, each of the routes that have been used the predetermined number of times or more within the predetermined period may be determined as the movement path to be analyzed. In any event, the control section 20 executes the processing described above for each of the plurality of users. As a result, the movement path to be analyzed has been acquired for each user. Through the processing described above, a movement path, the frequency of use of which by the user is high and which strongly reflects the taste of the user, is acquired as the movement path to be analyzed. Therefore, it is possible to define a movement path for performing a highly reliable analysis as the movement path to be analyzed. In determining whether or not movement paths have a common departure location and a common destination location, as a matter of course, departure locations in a plurality of movement histories may be considered as the same departure location if the distance between the departure locations is within a predetermined range, and destination locations in a plurality of movement histories may be considered as the same destination location if the distance between the destination locations is within a predetermined range.

(3) Reference Route Acquisition Processing

Figure 2B:
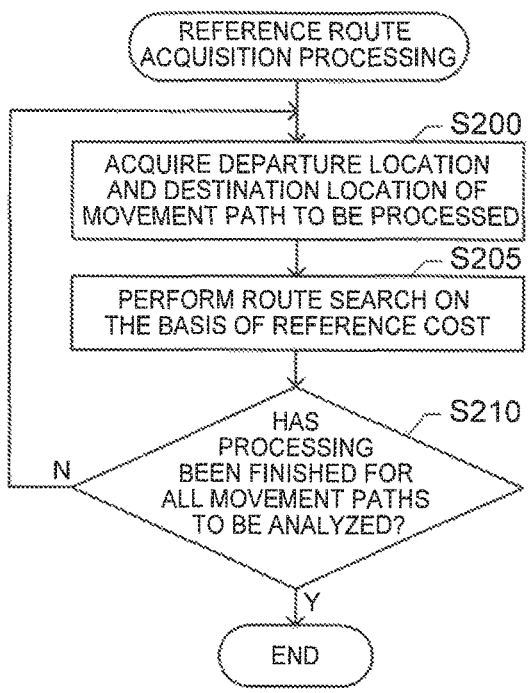
FIG. 2B is a flowchart of reference route acquisition processing.

Next, reference route acquisition processing performed in the configuration discussed above will be described in detail. FIG. 2B is a flowchart illustrating the reference route acquisition processing. In the embodiment, this processing is executed after the movement path acquisition processing is executed. In the reference route acquisition processing, the control section 20 extracts one unprocessed movement path from the movement paths to be analyzed for each user as the movement path to be processed, and executes processing in and after step S200.

In step S200, through processing performed by the difference value acquisition section 21b1, the control section 20 acquires the departure location and the destination location of the movement path to be processed (step S200). That is, the control section 20 references the movement path information 30a for the movement path to be processed, and acquires the departure location and the destination location. Next, through processing performed by the difference value acquisition section 21b1, the control section 20 references the map information 30b, and executes a route search on the basis of the reference cost (step S205). That is, the control section 20 searches for a route such that the total sum of the link cost (which is obtained by multiplying the reference link cost by the reference coefficient for the link cost) and the movement cost (which is obtained by multiplying the reference movement cost by the reference coefficient for the movement cost) of road sections that constitute a route from the departure location to the destination location acquired in step S200. When a reference route is found through the search, the control section 20 correlates information that indicates the reference route with information that indicates the movement path to be processed, and stores the resulting information in the storage medium 30 as the reference route information 30c.

Next, through processing performed by the difference value acquisition section 21b1, the control section 20 determines whether or not the processing in steps S200 and S205 has been finished for all the movement paths to be analyzed (step S210). In the case where it is not determined in step S210 that the processing in steps S200 and S205 has been finished for all the movement paths to be analyzed, the control section 20 extracts one unprocessed movement path from the movement paths to be analyzed for each user as the movement path to be processed, and repeats the processing in and after step S200. In the case where it is determined in step S210 that the processing in steps S200 and S205 has been finished for all the movement paths to be analyzed, the control section 20 ends the reference route acquisition processing. As a result, a reference route has been defined for all the movement paths to be analyzed for each user.

(4) Classification Processing

Figure 2C:
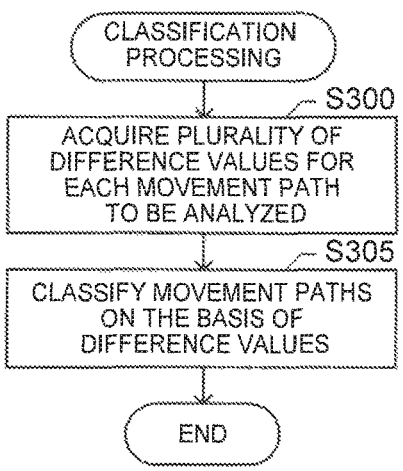
FIG. 2C is a flowchart of classification processing.

Next, classification processing performed in the configuration discussed above will be described in detail. FIG. 2C is a flowchart illustrating the classification processing. In the embodiment, this processing is executed after the reference route acquisition processing is executed. In the classification processing, through processing performed by the difference value acquisition section 21b1, the control section 20 acquires a plurality of difference values for each movement path to be analyzed (step S300). That is, the control section 20 acquires a plurality of difference values for each movement path to be analyzed by acquiring, for each of the movement paths to be analyzed, characteristic values for a plurality of characteristic items for the movement path and characteristic values for a plurality of characteristic items for the reference route and acquiring a difference between the characteristic values for each of the characteristic items.

Specifically, the control section 20 references the map information 30b for each of the movement paths to be road attribute, or may be a value specified in accordance with dynamic information such as the congestion degree.

Table 1 indicates an example of the characteristic values which are obtained through the processing described above.

TABLE 1

| Movement path | | Reference route | | Difference | |
|---|---|---|---|---|---|
| Characteristic item | Characteristic value | Characteristic item | Characteristic value | Characteristic item | Characteristic value |
| Proportion of toll road | 57% | Proportion of toll road | 0% | Proportion of toll road | +57% |
| Proportion of general road | 43% | Proportion of general road | 100% | Proportion of general road | −57% |
| Average number of lanes | 3 | Average number of lanes | 2 | Average number of lanes | +1 |
| Number of traffic signals | 1 | Number of traffic signals | 2 | Number of traffic signals | −1 |
| Route length | 24.2 km | Route length | 20.5 km | Route length | +3.7 km |
| Required time | 28 minutes | Required time | 35 minutes | Required time | −7 minutes |
| Toll | 500 yen | Toll | 0 yen | Toll | +500 yen | analyzed and the reference route, and specifies road sections that constitute the route. Furthermore, the control section 20 acquires the distance of each road section from the positions of end points of the road section, and acquires the sum of the distances of the road sections which constitute the route to acquire the route length of the movement path to be analyzed. In addition, the control section 20 specifies a toll road in the road sections which constitute each of the movement paths to be analyzed and the reference route, and acquires the route length of the toll road. The control section 20 then acquires the proportion of the toll road by dividing the route length of the toll road by the route length of the movement path. In addition, the control section 20 references the map information 30b, and acquires a toll required to travel through sections of the toll road on the basis of the sections of the toll road. The control section 20 further specifies a general road in the road sections which constitute each of the movement paths to be analyzed and the reference route, and acquires the route length of the general road. The control section 20 then acquires the proportion of the general road by dividing the route length of the general road by the route length of the movement path.

Furthermore, the control section 20 references the map information 30b, acquires the number of lanes in the road sections which constitute each of the movement paths to be analyzed and the reference route, and acquires the average number of lanes by dividing the sum of the numbers of the lanes by the number of the road sections. The control section 20 further references the map information 30b, determines whether or not there are traffic signals at end points of or in the middle of the road sections which constitute each of the movement paths to be analyzed and the reference route, and in the case where there are traffic signals, counts the number of the traffic signals. Furthermore, the control section 20 references the map information 30b, acquires the length of the road sections which constitute each of the movement paths to be analyzed and the reference route, and acquires a required time for each road section by dividing the length of the road section by the average vehicle speed for the road section. The control section 20 then acquires the required time for each of the movement paths to be analyzed and the reference route by acquiring the sum of the required times for the road sections. The average vehicle speed for each road section may be a value decided in advance for each That is, in Table 1, the characteristic values for the characteristic items for the movement path are indicated on the left side, and the characteristic values for the characteristic items for the reference route are indicated in the middle.

When the characteristic values for the characteristic items are acquired as indicated in the table, through processing performed by the difference value acquisition section 21b1, the control section 20 acquires the difference values by subtracting the characteristic values for the reference route from the characteristic values for the movement path for each of the characteristic items. In Table 1, the difference values which indicate the difference between the two routes are indicated for each of the characteristic items on the right side. The control section 20 executes, for each of the movement paths to be analyzed, processing of acquiring the difference values for a plurality of characteristic items on the basis of the movement path to be analyzed and the reference route for the movement path to be analyzed. As a result, the difference values have been acquired for each of the movement paths to be analyzed for each user.

When the difference values are acquired, through processing performed by the difference value classification section 21b2, the control section 20 classifies the movement paths on the basis of the difference values (step S305). That is, the control section 20 executes a factor analysis by considering the difference values acquired in step S300 as a plurality of observation variables that indicate characteristics of each of the movement paths to be analyzed. The control section 20 classifies the movement paths into a plurality of types on the basis of the correlation between the movement paths and the factors. For example, the movement paths are classified into a plurality of types by calculating a factor score that indicates the degree of correlation between the movement paths and the factors and classifying movement paths with a common factor of a relatively high score into the same type. When the movement paths are classified into a plurality of types, the control section 20 stores the classification information 30d which indicates the result of the factor analysis in the storage medium 30.

(5) Cost Setting Processing

Next, cost setting processing performed in the configuration discussed above will be described in detail. FIG. 3A is a flowchart illustrating the cost setting processing. In the embodiment, this processing is executed after the classification processing is executed. In the cost setting processing, through processing performed by the cost setting section 21c, the control section 20 sets initial values of coefficients (step S500). That is, in the embodiment, the coefficient for the link cost is decided for each type and each road attribute and the coefficient for the movement cost between roads is decided for each type to enable execution of a route search according to the taste of the user.

To this end, the control section 20 tentatively sets the values of the link cost and the movement cost, and calculates ideal values while gradually changing the tentatively set values. Thus, in step S500, the control section 20 sets initial values for tentatively setting the coefficients for the link cost and the movement cost. Here, the initial values may be any value, and examples of the initial values include the reference coefficient by which the reference cost is multiplied and a value that is approximate to the reference coefficient.

Next, through processing performed by the cost setting section 21c, the control section 20 specifies a type for which the cost is to be set (step S505). That is, the control section 20 references the classification information 30d, and specifies, from among the plurality of types which are indicated in the classification information 30d, a type that has not been processed in steps S505 to S545 as the type to be processed.

Next, through processing performed by the cost setting section 21c, the control section 20 acquires the values of the coefficients after adjustment (step S510). Table 2 indicates the coefficient for the link cost during adjustment. Table 3 indicates the coefficient for the movement cost during adjustment.

TABLE 2

| | | Attribute of road | | Type | | |
|---|---|---|---|---|---|---|
| | Road type | Number of lanes | Road width | A | B | C |
| Coefficient for link cost | General/toll | 1 each way | Narrow | 10 | 10 | 10 |
| | General/toll | 1 each way | Wide | 1.5 | 3 | 2 |
| | General/toll | 2 each way | Narrow | 1 | 0.6 | 0.7 |
| | ... | ... | ... | ... | ... | ... |
| | National | 1 each way | Narrow | 1 | 0.5 | 0.33 |
| | ... | ... | ... | ... | ... | ... |

TABLE 3

| | Characteristic of road before movement | Type | | |
|---|---|---|---|---|
| | | A | B | C |
| Coefficient for movement cost | With traffic signal, straight | 145 | 145 | 165 |
| | With traffic signal, right/left turn | 145 | 245 | 165 |
| | With traffic signal for right/left turn, right/left turn | 200 | 300 | 200 |
| | ... | ... | ... | ... |
| | Without traffic signal, sharp right turn | 120 | 220 | 140 |
| | ... | ... | ... | ... |

Table 2 indicates, by way of example, that the coefficient for setting the link cost has different values depending on the road type, the number of lanes, and the road width, which are the attributes of the road. Table 3 indicates, by way of example, that the coefficient for setting the movement cost has different values depending on the characteristic of the road before movement. Furthermore, Tables 2 and 3 indicate that such a link cost and a movement cost are defined for each type. In these examples, a coefficient of 1 does not fluctuate the reference link cost and the reference movement cost. Moreover, as the cost is larger, the movement path is less likely to be found as a route through the search. Therefore, a coefficient of more than 1 means that the movement path is less likely to be found as a route through the search, and a coefficient of less than 1 means that the movement path is more likely to be found as a route through the search, compared to the reference link cost and the reference movement cost.

As described above, the control section 20 adjusts the tentatively set values of the coefficient of the link cost, which is defined for each type and each attribute of the road, and the coefficient of the movement cost, which is defined for each type, in step S510. That is, the link cost is defined for each attribute of the road, and therefore the control section 20 adjusts the values of the coefficients in accordance with rules prescribed for the attribute of the road, and acquires the values of the coefficients after the adjustment as values tentatively set for the type to be processed. In the embodiment, meanwhile, the movement cost is defined for each characteristic of the road before movement, and therefore the control section 20 adjusts the values of the coefficients in accordance with rules prescribed for each condition, and acquires the values of the coefficients after the adjustment as values tentatively set for the type to be processed.

In the case of the first execution of step S510 after execution of step S500, the control section 20 adjusts the values of the coefficients which have been set to the initial values. In the case of the second or subsequent execution of step S510, meanwhile, the control section 20 adjusts the current values of the coefficients to next values. The prescribed rules may be rules that enable adjustment of the values of the coefficients, and a variety of rules can be adopted. The amount by which the values of the coefficients are adjusted by the rules may have a constant value or be varied in accordance with the degree of coincidence, and a variety of values can be adopted.

Next, the control section 20 tentatively sets the costs by multiplying the reference link cost and the reference movement cost by the respective coefficients after the adjustment (step S515). That is, the reference link cost has been defined for each type and each attribute of the road as with the coefficient for the link cost indicated in Table 2. Therefore, the control section 20 acquires the link cost as a value tentatively set for the type to be processed by multiplying the reference link cost for each attribute of the road by the value of the coefficient for each attribute of the road. In addition, the reference movement cost has been defined for each type and each characteristic of the road before the movement as with the coefficient for the movement cost indicated in Table 3. Therefore, the control section 20 acquires the movement cost as a value tentatively set for the type to be processed by multiplying the reference movement cost for each characteristic of the road before the movement by the value of the coefficient for each characteristic of the road before the movement.

Next, the control section 20 performs a route search on the basis of the link cost and the movement cost which have been tentatively set (step S520). That is, the control section 20 acquires the movement paths which are classified into the type to be processed on the basis of the movement path information 30a, and specifies the departure location and the destination location of each of the movement paths. The control section 20 searches for a route from the departure location to the destination location on the basis of the link cost and the movement cost which have been tentatively set in step S515. The above processing is executed for each of the movement paths classified into the type to be processed (the processing can be omitted for routes that have a common departure location and a common destination location).

Next, the control section 20 acquires the degree of coincidence between the route which is found through the search in step S520 and the movement path (step S525). That is, in step S520, a search is performed for each of the movement paths, and therefore the control section 20 executes, for each movement path, processing of dividing the distance of a section in which the found route and the movement path coincide with each other by the distance of the movement path, and acquires a statistical value (e.g. an average value) for each movement path as the degree of coincidence for the tentatively set costs.

Next, the control section 20 tentatively registers the coefficients in the case where the degree of coincidence is maximized (step S530). That is, since the control section 20 has acquired the degree of coincidence for the tentatively set costs in step S525, the control section 20 makes a comparison between such a degree of coincidence and the degree of coincidence which was acquired in the course of the loop processing of steps S510 to S535 in the past. In the case where the degree of coincidence calculated last is the larger, the control section 20 tentatively registers the coefficients which were acquired in step S510 together with the degree of coincidence in the RAM or the like.

Next, the control section 20 determines whether or not an analysis end condition has been met (step S535). Here, the analysis end condition is a condition for determining whether or not the coefficients are sufficiently close to ideal values. Examples of the analysis end condition include a variety of conditions such as a condition that the degree of coincidence has converged to a maximum value, a condition that the deviation of the degree of coincidence in the course of the loop processing has become equal to or less than a predetermined value, and a condition that a prescribed number of times of loop processing has been ended. In the case where it is not determined in step S535 that the analysis end condition has been met, the control section 20 repeats the processing in and after step S510. That is, the control section 20 repeats the loop processing in and after step S510 in order to obtain ideal coefficients for the type to be processed.

In the case where it is determined in step S535 that the analysis end condition has been met, on the other hand, the control section 20 stores the coefficient information 30*e* which indicates the coefficients for the type to be processed in the storage medium 30 (step S540). Through the processing described above, the control section 20 sets the link cost for each attribute of the road for the type to be processed in order that the attribute of the road which is included in a plurality of movement paths classified into the type to be processed tends to be found through the search compared to the attribute of the road which is not included in such movement paths. With this configuration, the possibility that road sections of the same attribute as the road attribute of the road sections which are included in the movement path which is classified into the type to be processed are obtained as the search result is increased in the case where a route search is performed for a user of the type to be processed. Through the processing described above, further, the coefficients with which the degree of coincidence acquired in step S525 is maximized is adopted, and therefore the costs for each attribute of the road which is included in a plurality of movement paths can be optimized. As a result, costs that reflect a taste can be defined through simple processing.

Next, the control section 20 determines whether or not the processing in steps S505 to S540 has been performed for all the types classified in step S305 (step S545). In the case where it is not determined in step S545 that the processing has been finished for all the types, the control section 20 executes the processing in and after step S505. That is, the processing in and after step S505 is repeated with the type to be processed changed. In the case where it is determined in step S545 that the processing has been finished for all the types, on the other hand, the control section 20 ends the cost setting processing.

(6) Route Searcher Classification Processing

Figure 2D:
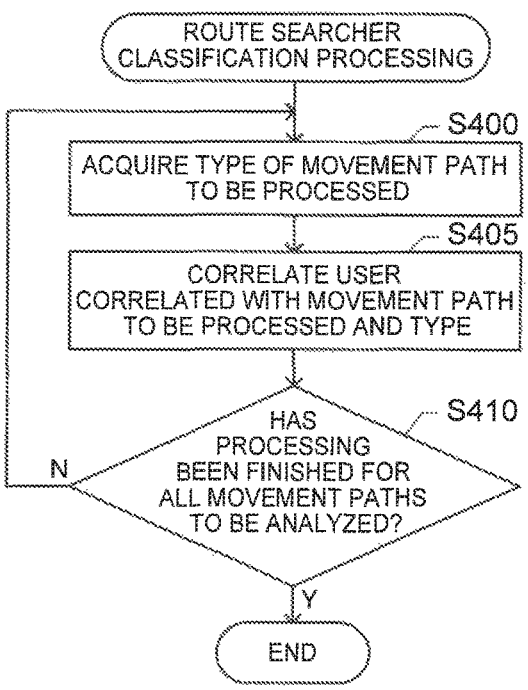
FIG. 2D is a flowchart of route searcher classification processing.

Next, route searcher classification processing performed in the configuration discussed above will be described in detail. FIG. 2D is a flowchart illustrating the route searcher classification processing. In the embodiment, this processing is executed at predetermined intervals after the classification processing is executed at least once. In the route searcher classification processing, through processing performed by the route searcher classification section 21*d*, the control section 20 selects a movement path that has not been processed from among the movement paths to be analyzed which are acquired by the movement path acquisition section 21*a*, and executes the processes in and after step S400 on the movement path as the movement path to be processing In step S400, through processing performed by the route searcher classification section 21*d*, the control section 20 acquires the type of the movement path to be processed (step S400). That is, the movement path to be processed has already been classified in step S305, and therefore the control section 20 acquires the type into which the movement path to be processed has been classified on the basis of the classification information 30*d* generated in step S305.

Next, the control section 20 correlates the user who is correlated with the movement path to be processed and the type (step S405). That is, the movement path information 30*a* stores information that indicates the user together with the movement path, and therefore the control section 20 references the movement path information 30*a*, specifies the user who is correlated with the movement path to be processed, and considers the type of the user as the type acquired in step S400.

Next, through processing performed by the route searcher classification section 21*d*, the control section 20 determines whether or not the processing in steps S400 and S405 has been finished for all the movement paths to be analyzed (step S410). In the case where it is not determined in step S410 that the processing in steps S400 and S405 has been finished for all the movement paths to be analyzed, the control section 20 extracts one unprocessed movement path from the movement paths to be analyzed for each user as the movement path to be processed, and repeats the processing in and after step S400. In the case where it is determined in step S410 that the processing in steps S400 and S405 has been finished for all the movement paths to be analyzed, the control section 20 ends the route searcher classification processing.

As a result, all the users of the vehicles C that transmitted a movement path that is the same as (that can be considered to be the same as) the movement path to be analyzed have been correlated with a type. Thus, in the case where any of the users, the type of which has been defined, has made a route search request as the route searcher, it is possible to specify the type of the route searcher. The type classification method described above is exemplary. As a matter of course, the type of the route searcher may be acquired by acquiring the movement path of the route searcher from the navigation system 200, for example, and performing a classification for the characteristics of the movement path through processing performed by the classification section 21b.

(7) Route Search Processing

Next, route search processing performed in the configuration discussed above will be described in detail. FIG. 3B is a flowchart illustrating the route search processing. This processing is executed in the case where a route search request is output from the navigation system 200 and the route search request is received by the control section 20. In the route search processing, the control section 20 acquires the type of the route searcher (step S600). That is, the route search request includes information that indicates a user that made the route search request. Therefore, the control section 20 considers the user as the route searcher, references the correlation between the user and the type which have been correlated with each other in step S405, and acquires the type of the route searcher who made a route search.

Next, through processing performed by the cost setting section 21c, the control section 20 sets a cost for the type which is acquired in step S600 (step S610). That is, the control section 20 references the coefficient information 30e, acquires a coefficient for each road attribute for the link cost for the type acquired in step S600, and acquires a coefficient for each characteristic of the road before the movement for the movement cost for the type. The control section 20 then acquires a link cost by multiplying the reference link cost by the coefficient for each road attribute, and acquires a movement cost by multiplying the reference movement cost by the coefficient for each characteristic of the road before the movement.

Next, through processing performed by the route search section 21e, the control section 20 performs a route search (step S615). That is, the control section 20 performs a route search using a Dijkstra's algorithm or the like on the basis of the link cost and the movement cost which are acquired in step S610. Through processing performed by the route search section 21e, the control section 20 transmits route information (step S620). That is, the control section 20 defines route information that indicates the found route, controls the communication section 40, and transmits the route information to the navigation system 200 which made the route search request. As a result of the processing described above, a movement path in which road sections that match the taste of the route searcher are adopted is provided to the navigation system 200. Thus, with the navigation system 200 providing guidance on the basis of the route information, it is possible to provide guidance for movement along a route that matches the taste of the user.

(8) Other Embodiments

The embodiment described above is an example, and a variety of other embodiments can be adopted as long as a movement path is classified into a type that indicates the taste of the user on the basis of a plurality of characteristics of the movement path. For example, means that constitute the route search system may be implemented by one device as in the embodiment discussed above, or may be provided separately as two or more devices. Examples of the latter include a configuration in which processing of acquiring a movement path to be analyzed performed by the movement path acquisition section 21a, processing of acquiring difference values performed by the classification section 21b, processing performed by the cost setting section 21c, processing performed by the route search section 21e, and so forth are executed by the navigation system 200. As a matter of course, a control section other than the control section illustrated in FIG. 1 may execute some of the means.

Furthermore, the movement path is not limited to a route for movement of the vehicle C, and may be a route for a pedestrian or the like. In addition, the vehicle C is not limited to an automobile, and may be a bicycle or the like. As a matter of course, the navigation system 200 may be a device mounted on the vehicle C, and may be a portable device. Furthermore, a plurality of versions of the map information may be present. For example, a configuration in which all versions of the map information including the latest version are reproducible from the map information 30b of the route search system 10 is assumed. In this configuration, in the case where the navigation system 200 uses map information of a version that is older than the latest version, the version of the map information being used may be transmitted from the navigation system 200 to the route search system 10 so that the route search system 10 can acquire a reference route on the basis of the map information of the version being used.

Furthermore, a plurality of movement paths to be analyzed may be defined for the same user. For example, in the case where there are a plurality of routes, the frequency of use of which by the same user is a predetermined frequency of use or more, each of the movement paths may be determined as the movement path to be analyzed. In this case, the movement paths may be classified into different types. Therefore, a condition under which a movement path is selected (such as the time and date, the time band, the day of the week, the area, and the destination location, for example) may be correlated with the movement path, each movement path is correlated with a condition, and type classification may be referenced, in the case where a route search request is made under the same condition, so that the costs are set for each condition. In the case where the same vehicle C is used by a plurality of users, as a matter of course, movement paths for the users may be determined as the movement paths to be analyzed. In this case, a differentiation is made among the types of the route searchers in the case where each of the users is determined as the route searcher.

The movement path acquisition means may be capable of acquiring movement paths of a plurality of users. That is, the movement path acquisition means may be capable of acquiring information that indicates the movement paths as a movement history of the plurality of users so as to be able to analyze the characteristics of the movement paths. Thus, the movement path acquisition means may be capable of acquiring information that indicates the movement paths so as to be able to analyze the characteristics of the movement paths, and the information which indicates the movement paths may include static information related to the movement paths, and may include dynamic information related to the movement paths.

The static information which is related to the movement paths is assumable as a variety of information. Examples of such information are assumed to include the roads (road sections) which are determined as the movement paths, the length, the road type, the number of lanes, and the number of traffic signals. The dynamic information which is related to the movement paths may be information that may be fluctuated in accordance with a condition under which the vehicle has moved along the movement path etc. Example of such information are assumed to include the required time, the movement speed, the toll required for the movement, the fuel efficiency, and the time and date. When movement paths are acquired, as a matter of course, various types of other information to be analyzed may be acquired in an accompanying manner. For example, information such as the age of the user and the vehicle type of the vehicle which is used by the user may be acquired in an accompanying manner.

The movement path may be a route, the frequency of use of which by the user is a predetermined criterion or more. That is, there is a high possibility that a path, the frequency of use of which by the user is a predetermined criterion or more (a path, the frequency of use of which can be considered to be higher than that of the other paths), has been selected by the user in accordance with his/her taste. Thus, it is possible to perform an analysis with high reliability by acquiring a path, the frequency of use of which by the user is a predetermined criterion or more, as the movement path of the user.

In this case, further, the movement path acquisition means may be configured such that, in the case where routes that have a common departure location and a common destination location and that coincide with each other in a section of a predetermined ratio or more are used a predetermined number of times or more within a predetermined period, the movement path acquisition means acquires the routes as the movement path. With this configuration, it is possible to easily define a movement path for performing a highly reliable analysis. In determining whether or not movement paths have a common departure location and a common destination location, as a matter of course, departure locations in a plurality of movement histories may be considered as the same departure location if the distance between the departure locations is within a predetermined range, and destination locations in a plurality of movement histories may be considered as the same destination location if the distance between the destination locations is within a predetermined range.

The classification means may be capable of classifying, on the basis of a plurality of characteristics of the movement paths of the plurality of users, the movement paths of each of the users into a plurality of types such that movement paths with a plurality of similar characteristics belong to the same type. That is, when a movement path that has a plurality of characteristics is treated as one sample, a plurality of samples that indirectly indicate the taste of the user using the plurality of characteristics have been obtained. Thus, it is possible to consider that the resulting classifications reflect a taste by classifying the samples such that samples with a plurality of similar characteristics belong to the same type.

The characteristics of the movement paths may be characteristics that affect route selection, and are preferably characteristics that distinguish the tastes of the users. Examples of such characteristics include difference values for a plurality of characteristics, the difference values each indicating a difference between a characteristic of a reference route and a characteristic of the movement paths of the plurality of users. The characteristics of a route are characteristics that may be used as judgment elements when the user selects a route, may be information that indicates the movement path itself, and may be information generated from information that indicates the movement path. Examples of the former include the road attribute of road sections that constitute the movement path. Examples of the latter include the ratio of the road attribute of road sections that constitute the movement path in the movement path.

The reference route may be defined as a route, with which a contrast is made to clarify the taste of the user. Examples of the reference route include a route selected by many users, a route suggested by default in the route search processing, and a route that is least affected by the taste. Examples of the route which is selected by many users include a route, the frequency of use of which by a plurality of users is a predetermined criterion or more. By determining such a route as the reference route, it is possible to distinguish the characteristics of a route selected by a user with a taste that is different from those of many users. In this case as well, as a matter of course, in the case where routes that have a common departure location and a common destination location for a plurality of users and that coincide with each other in a section of a predetermined ratio or more are used a predetermined number of times or more within a predetermined period, the route from the departure location to the destination location may be determined as the reference route.

Examples of the route which is suggested by default in the route search processing include a route to be found in the case where a route search is performed from a departure location to a destination location of the movement path on the basis of a cost set by multiplying a reference cost decided in advance by a reference coefficient (e.g. the link cost which is obtained by multiplying the reference link cost by the reference coefficient for the link cost and the movement cost which is obtained by multiplying the reference movement cost by the reference coefficient for the movement cost). With this route, it is possible to distinguish the taste of a user that has not selected a route suggested by default.

The difference between the characteristics of the reference route and the characteristics of the movement path may be the difference between the characteristics for the entire routes, and may be the difference between the characteristics for different sections of the two routes (e.g. sections included in only the movement path). Examples of the former include the difference in proportion of the toll road between the two routes. Examples of the latter include the number of curves included in different sections of the two routes. In any event, the difference between the characteristics is acquired as a difference value that indicates the difference between the characteristics as a value for type classification.

In the case where the difference values are acquired as the characteristics of the movement paths in this way, the classification means acquires classifications of the movement paths by classifying the movement paths of each of the users into a plurality of types such that movement paths with a plurality of similar characteristics belong to the same type. That is, the difference values for each movement path are constituted from a plurality of difference values corresponding to a plurality of characteristics. Therefore, when such a set of the plurality of difference values is treated as one sample, a plurality of samples that indicate the taste of the user have been obtained by the difference value acquisition means. Thus, it is possible to consider that the resulting classifications reflect a taste by classifying the samples such that samples with similar difference values belong to the same type.

A variety of techniques can be adopted as the technique of classifying the difference values into a plurality of types. For example, the difference value classification means may perform a multivariate analysis using the difference values for the plurality of characteristics as variables to classify the movement paths into the plurality of types which correspond to a plurality of tastes of the users. With this configuration, the movement paths can be automatically classified into types without artificially setting types. In addition, the difference values can be easily classified into a plurality of types on the basis of a plurality of difference values for a plurality of samples. In the multivariate analysis, the difference values may be classified into a plurality of types using the difference values as variables. A factor analysis, a cluster analysis, or the like can be adopted as an example of the multivariate analysis.

The cost setting means may be capable of setting a cost for each of the types and each attribute of a road on the basis of the plurality of movement paths of each of the types. That is, the cost is an index to be referenced in route search. The magnitude of the cost of each road section indicates whether or not each road section tends to be adopted as a route. Thus, the route as the search result may be different by adjusting the value of the cost. Thus, a road section that is highly likely to be selected by users that have a taste for each type tends to be obtained as the search result by setting the cost of the road for each of the types.

The cost setting means sets the cost for each type, and for each attribute of the road. That is, there may be a plurality of types of attributes of the road, and the cost setting means sets the cost of the road of a certain attribute for each type. Thus, the cost for a certain attribute of the road may have different values for different types. Furthermore, when the cost is set for each attribute of the road, the cost is set to a common value, or set using a common setting method, at least for a plurality of roads of the same type and the same attribute. Thus, it is not necessary to set the cost for individual links, and it is possible to also set the cost for links, a movement history for which has not been acquired. The attribute of the road may be an attribute that serves as a judgment element for route selection. For example, a configuration in which at least one of the road type, the number of lanes, and the road width is used as the attribute of the road is assumable.

The route searcher classification means may be capable of classifying, on the basis of a plurality of characteristics of a movement path of a route searcher, the route searcher into one of the types which are decided by the classification means. That is, the classifications of the movement paths which are classified by the classification means can be considered as the types of the tastes of the users. Thus, it is possible to consider the type of each movement path as the type of each user by specifying the user who transmitted information that indicated the movement path to the route search system. As a matter of course, the movement path of the route searcher may be acquired, a comparison is made between a plurality of characteristics of the movement path and a plurality of characteristics of the movement paths which belong to each type, and the route searcher may be considered to belong to a type, the characteristics of which are similar to the plurality of characteristics of the movement path of the route searcher. Classifying the route searcher into one of the types which are decided by the classification means in this way substantially corresponds to specifying the taste of the route searcher.

The route search means may be capable of searching for a route on the basis of the cost which is set for the type of a route searcher. That is, the route search means may be capable of searching for a route to be found as a result of route selection made in conformity to the taste of the route searcher by searching for a route on the basis of the cost which is set for the type of the route searcher. The route search can be executed using a variety of techniques. For example, the route search may be performed using a Dijkstra's algorithm or the like on the basis of the cost which is set for the type of the route searcher.

A variety of setting methods can be adopted as the method of setting the cost for each type and each attribute of the road. For example, a configuration in which the cost is set such that a road section that is highly likely to be selected by users that have a taste for each type tends to be obtained as the search result can be adopted. Examples of such a configuration include a configuration in which the cost for each attribute of the road is set such that a plurality of movement paths classified into the same type tend to be found through the search. With this configuration, the possibility that road sections included in the movement path which belongs to a certain type are obtained as the search result in a route search for the certain type is increased by setting the cost for each attribute of the road for each type. Furthermore, the possibility that road sections of the same attribute as the road attribute of the road sections which are included in the movement path which belongs to a certain type are obtained as the search result in a route search for the certain type is increased.

Furthermore, the cost setting means may be configured to set the cost for each attribute of the road for a first type such that the attribute of the road which is included in a plurality of movement paths classified into the first type tends to be found through the search compared to the attribute of the road which is not included in such movement paths. With this configuration, the possibility that road sections of the same attribute as the road attribute of the road sections which are included in the movement path which belongs to a certain type are obtained as the search result in a route search for the certain type is increased. Here, the first type refers to any type. Thus, the cost setting means may be configured to set the cost for each attribute of the road for each of the plurality of types such that the attribute of the road which is included in a plurality of movement paths classified into each type tends to be found through the search compared to the attribute of the road which is not included in such movement paths (the same applies hereinafter for the expression "first type").

Furthermore, the cost setting means may be configured to set the cost for each attribute of the road for a first type by tentatively setting the cost for each attribute of the road which is included in a plurality of movement paths classified into the first type and adjusting the tentatively set cost such that a degree of coincidence between a route found through the search on the basis of the tentatively set cost and the movement paths which are classified into the first type is maximized. That is, the cost setting means optimizes the cost for each attribute of the road which is included in a plurality of movement paths by repeating tentative setting and adjustment of the cost. As a result, costs that reflect a taste can be defined through simple processing. The degree of coincidence between a route found through the search and the movement paths which are classified into the first type can be defined using a variety of techniques, and can be evaluated in accordance with the distance over which the two routes coincide with each other, the number of road sections in which the two routes coincide with each other, the ratios thereof, or the like.

Furthermore, the cost setting means may be configured to set the cost for each of the types and each attribute of the road by multiplying a reference cost (a reference link cost and a reference movement cost) for each road section by a coefficient set for each of the types and each attribute of the road. With this configuration, the cost for each type can be defined by deciding the amount of correction for each type and each attribute of the road, which makes it possible to save resources compared to individually holding information that indicates costs for all types. In addition, the cost can be changed easily even in the case where the cost is changed along with an increase in amount of accumulated information that indicates movement paths or the like.

Furthermore, the cost setting means may be configured to set a movement cost for movement between roads for each of the types. That is, a cost that may be adjusted in order to reproduce route selection may be present besides the attribute of the road. The movement cost for movement between roads is an index that indicates whether or not a road section to which a movement is to be made when making a movement from a certain road section to another road section tends to be a route found as the search result. The frequency of movement to a different road section may differ in accordance with the taste of the user. For example, there may be present users that have different tastes, such as a user that does not mind making a right or left turn but that has a taste for shortening time or distance or avoiding a traffic jam and a user that has a taste for avoiding occurrence of a right or left turn rather than minding time, distance, or a traffic jam. Thus, in a configuration in which the movement cost for movement between roads is set for each type, a cost that matches an element that is important for route selection can be set. The movement cost may be defined for each condition for movement to a different road section. Examples of such a condition include characteristics of the road before the movement, more specifically the presence or absence of a traffic signal, the presence or absence of a traffic signal for a right or left turn, the presence or absence of a lane for a right or left turn, the angle of a curve, and so forth.

When defining taste types on the basis of the characteristics of the movement paths of the plurality of users as described above, it is also possible to classify the users into types. For example, the classification means may be configured to classify, on the basis of a plurality of characteristics of the movement paths of the plurality of users, the users into a plurality of types such that similar characteristics belong to the same type. That is, the classification means considers that the plurality of characteristics of the movement paths of the users are correlated with the users, and classifies the users by classifying samples with a plurality of similar characteristics into the same type. With this configuration, it is possible to perform a route search according to the taste of the route searcher by searching for a route with the route searcher classified into one of the types. The above configuration can be implemented by considering the classifications of the movement paths as the classifications of the users in the configuration illustrated in FIG. 1. That is, in the embodiment discussed above, each movement path is correlated with information that indicates the user of the navigation system 200 which transmitted the movement path. Therefore, it is possible to consider the classifications of the movement paths also as the classifications of the users.

Furthermore, the technique by which a movement path is classified into a type that indicates the taste of the user on the basis of a plurality of characteristics of the movement path may also be applied as a program and a method. In addition, it can be assumed that the system, program, and method described above are implemented as a single device or implemented by a plurality of devices, and the system, program, and method include a variety of aspects. For example, a server, method, and program that includes the means described above can be provided. Various changes may be made. For example, some units may be implemented using software, and the others may be implemented using hardware. Furthermore, a storage medium may store a program that controls the system. As a matter of course, the storage medium for the software may totally equally be a magnetic storage medium or a magneto-optical storage medium. As used herein, the term "storage medium" is not intended to encompass transitory signals.

The invention claimed is:

1. A route search system comprising:
a processor programmed to:
acquire movement paths of a plurality of users;
acquire difference values for a plurality of characteristics, the difference values each indicating a difference between a characteristic value of a reference route and a characteristic value of the movement paths of the plurality of users;
classify, on a basis of the plurality of characteristics of the movement paths of the plurality of users with a plurality of difference values into a plurality of groups; set a cost for each of the groups and each attribute of a road on a basis of the plurality of movement paths of each of the groups;
classify, on a basis of a plurality of characteristics of a movement path of a user into one of the groups; and
select a route on a basis of the cost which is set for the group the user is classified.

2. The route search system according to claim 1, wherein the processor is programmed to:
set the cost for each attribute of the road such that the plurality of movement paths which are classified into a same group is found through a search.

3. The route search system according to claim 1, wherein the processor is programmed to:
set a cost for each attribute of the road for a first group such that on an attribute of the road which is included in the plurality of movement paths classified into a first group is found through a search compared to another attribute of the road which is not included in the plurality of movement paths.

4. The route search system according to claim 1, wherein the processor is programmed to:
set a cost for each attribute of the road for a first group by tentatively setting a cost for each attribute of the road which is included in the plurality of movement paths classified into the first group and adjusting the tentatively set cost such that a degree of coincidence between a route found through a search on a basis of the tentatively set cost and the movement paths which are classified into the first group is maximized.

5. The route search system according to claim 1, wherein the processor is programmed to:
set the cost for each of the groups and each attribute of the road by multiplying a reference cost for each road section by a coefficient set for each of the groups and each attribute of the road.

6. The route search system according to claim 1, wherein an attribute of the road includes at least one of a road type, the number of lanes, and a road width.

7. The route search system according to claim 1, wherein the processor is programmed to:
set a movement cost for movement between roads for each of the groups.

8. The route search system according to claim 1,
wherein the processor is programmed to:
perform a multivariate analysis using the difference values for the plurality of characteristics as variables to classify the difference values into the plurality of groups which correspond to a plurality of preferences of the plurality of users.

9. A route search system comprising:
a processor programmed to:
acquire movement paths of a plurality of users;
acquire difference values for a plurality of characteristics, the difference values each indicating a difference between a characteristic value of a reference route and a characteristic value of the movement paths of the plurality of users;
classify, on a basis of the plurality of characteristics of the movement paths of the plurality of users with a plurality of difference values into a plurality of groups;
set a cost for each of the groups and each attribute of a road on a basis of the plurality of movement paths of each of the groups; and
select a route on a basis of the cost which is set for the group which a user is classified based on the plurality of difference values.

10. A route search method comprising:
acquiring, by a processor, movement paths of a plurality of users;
acquiring, by the processor, difference values for a plurality of characteristics, the difference values each indicating a difference between a characteristic value of a reference route and a characteristic value of the movement paths of the plurality of users;
classifying, by the processor, on a basis of the plurality of characteristics of the movement paths of the plurality of users with a plurality of difference values into a plurality of groups;
setting, by the processor, a cost for each of the groups and each attribute of a road on a basis of the plurality of movement paths of each of the groups;
classifying, by the processor, on a basis of a plurality of characteristics of a movement path of a user into one of the groups; and
selecting, by the processor, a route on a basis of the cost which is set for the group the user is classified.

11. A non-transitory computer-readable storage medium storing a computer-executable route search program that when executed causes a computer to implement a method, the method comprising:
acquiring movement paths of a plurality of users;
acquiring difference values for a plurality of characteristics, the difference values each indicating a difference between a characteristic value of a reference route and a characteristic value of the movement paths of the plurality of users;
classifying, on a basis of the plurality of characteristics of the movement paths of the plurality of users with a plurality of difference values into a plurality of groups;
setting a cost for each of the groups and each attribute of a road on a basis of the plurality of movement paths of each of the groups;
classify, on a basis of a plurality of characteristics of a movement path of a user into one of the groups; and
selecting a route on a basis of the cost which is set for the group the user is classified.

* * * * *